Patented Dec. 25, 1951

2,580,289

UNITED STATES PATENT OFFICE 2,580,289

STYRENATED ALKYD-MELAMINE SULFON-AMIDE ETHER RESINS

Joel Fantl, Springfield, Mass., assignor to Monsanto Chemical Company, St. Louis, Mo., a corporation of Delaware No Drawing. Application June 20, 1947, Serial No. 756,095

8 Claims. (Cl. 260—45.3)

This invention relates to surface coating resins. More particularly, it relates to resins prepared from styrene, an alkyd resin, a drying oil and a sulfonamide modified melamine resin.

Synthetic resins have become prominent in recent years for use in surface coating compositions. Since a great variety of synthetic resins have been produced having a great diversity of physical properties, it has become more and more possible to formulate resins having specific properties. This situation has led to a critical examination into the qualities of surface coatings and a series of strict requirements have been developed. For example, a resin composition, to be satisfactory today, must provide coatings having a high and permanent gloss, resistance to alkali, resistance to solvents, good adhesion to a host of different surfaces, and hardness coupled with flexibility. The resins used should also be compatible with other surface coating resins such as alkyd and melamine resins so that blends of two or more resins may be made to meet specific requirements. Previously known resins fail to meet one or more of these requirements.

It is an object of this invention to provide new surface coating resins.

A further object is to provide surface coating resins having superior physical and chemical properties.

Another object is to provide surface coating resins which are compatible with other surface coating resins such as alkyd or melamine resins.

These and other objects are attained by reacting a copolymer of a polymerizable unsaturated compound and a drying oil modified alkyd resin with an aryl sulfonamide modified melamine resin.

The following examples are given in illustration and are not intended as limitations on the scope of this invention. Where parts are mentioned, they are parts by weight.

Example I 100 parts of a 60% dehydrated castor oil modified glyceryl phthalate resin having an acid value of less than 15 and a viscosity of G on the Gardner scale at 60% solids solution in xylol, and 100 parts of monomeric styrene were dissolved in 200 parts of xylol. The solution was heated at reflux temperature at atmospheric pressure in contact with 2 parts of benzoyl peroxide for about 7 hours. The product was a xylol solution of a copolymer of styrene and the alkyd resin, having a color of about 6 on the Gardner scale. At 46% solids the solution had a viscosity of L on the Gardner scale.

Example II

An aryl sulfonamide modified melamine resin was made as follows:

100 parts of melamine were mixed with 43 parts of para toluene sulfonamide and 463 parts of formalin (about 100 parts of formaldehyde). The mixture was adjusted to a pH of about 8–9 with aqueous alkali and then refluxed at atmospheric pressure until the reaction medium became cloudy. 505 parts of butanol were then added and the pH of the mixture was adjusted to below 7 with formic acid. The resultant mixture was refluxed at atmospheric pressure for about 2 hours. Water and butanol were removed by azeotropic distillation, dry butanol being returned to the reaction vessel. A butanol solution of a para toluene sulfonamide modified melamine-formaldehyde-butanol resin was obtained. The solution was concentrated under vacuum and then xylol was added to obtain a 50% solids solution in a 50-50 xylol-butanol mixture.

Example III 200 parts of a 50% solids solution in xylol of a copolymer obtained as shown in Example I were reacted with 100 parts of the para toluene sulfonamide modified melamine resin solution obtained in Example II, at 100° C. for 30 minutes. The product was a clear solution of a resin in a xylol-butanol mixture. At 50% solids the resin solution had a viscosity of J on the Gardner scale.

Films were prepared from this solution by casting on metal or glass, drying and then baking at 100° C. for 30 minutes. They had a high gloss, good solvent resistance and excellent alkali resistance, good adhesion and were hard but still flexible. The films had a Sward hardness of 45 and could be immersed in 1% alkali for 3 days without showing surface failure.

Example IV

Example III was repeated except that a copolymer of styrene and a linseed oil modified alkyd resin was used in place of the copolymer of styrene and castor oil modified alkyd resin. The product was very similar to that obtained in Example III and had similar properties.

Example V 100 parts of a copolymer of α-methyl styrene and a 60% dehydrated castor oil modified alkyd resin were reacted with 50 parts of a para toluene sulfonamide modified melamine resin in xylol-butanol solution for 30 minutes at 100° C. The syrup produced was cast on glass plates, solvent was evaporated, and films were obtained which were similar to those obtained in Example III except that they were somewhat softer.

*Example VI*

100 parts of a copolymer of 2,5-dichlorostyrene and a 60% dehydrated castor oil modified alkyd resin were reacted with 50 parts of a para toluene sulfonamide modified melamine resin in xylol-butanol solution for 30 minutes at 100° C. The resin solution produced was cast on steel plates, solvent was evaporated, and films were obtained which were similar to those obtained in Example III except that they were even harder.

The copolymer resins which may be used to make the resins of this invention are copolymers of polymerizable unsaturated compounds and drying oil modified alkyd resins.

The unsaturated polymerizable compounds which may be used are compounds containing a terminal unsaturated carbon to carbon linkage including vinyl, vinylidene, acrylic, and allyl compounds. Among the unsaturated polymerizable compounds which may be used are vinyl esters of organic acids such as vinyl acetate, vinyl benzoate, etc., vinyl halides such as vinyl chloride, vinyl ketones such as methyl vinyl ketone, vinyl ethers such as methyl vinyl ether, vinyl aryl compounds such as styrene and ring-substituted styrenes, vinylidene halides such as vinylidene chloride, acrylic and alpha substituted acrylic esters, amides, imides, nitriles, etc., allyl esters, allyl alcohol, allyl ethers and the $\beta$-substituted homologues thereof. Mixtures of two or more of these compounds may be used. The amount of unsaturated compound may be varied from about 50 to about 150 parts per 100 parts of drying oil modified alkyd resin.

In the preferred embodiment of this invention the unsaturated polymerizable compounds are mono vinyl derivatives of aromatic hydrocarbons and their substitution products. Examples of the preferred monomers are styrene, vinyl naphthalene, vinyl diphenyl and their polymerizable ring or side-chain substitution products such as para methyl, para ethyl, para chlor, 2,5-dichlor, $\alpha$-methyl and $\alpha$-ethyl styrenes.

The drying oils which may be used to modify the alkyd resin include such unsaturated oils as linseed oil, tung oil, perilla oil, oiticica oil, dehydrated castor oil, etc. The acids and glycerides or other derivatives of drying oils may also be used. Two or more of these oils or their derivatives may be used.

Any of the above mentioned oils may be used to modify alkyd resins to be copolymerized with the unsaturated compounds. The alkyd resins are condensation products of polyhydric alcohols containing at least 3 hydroxy groups such as glycerol, pentaerythritol, sorbitol, mannitol, trimethylol propane, hexanetriol and substitution products thereof such as $\alpha$ or $\beta$ methyl glycerol with a polybasic acid free from ethylenic unsaturation such as phthalic, succinic, sebacic, malonic, citric, terephthalic, chlorophthalic, etc. The ratio of polyhydric alcohol to polybasic acid may be varied between 3 equivalents by weight based on the number of hydroxyl groups and from 2 to 3 equivalents by weight based on the carboxyl groups. It is preferred to react the drying oil with the polyhydric alcohol at an elevated temperature and then to react the product with the polybasic acid at an elevated temperature. The amount of oil used may be varied from 40 to 65% based on total charge.

Part of the polyhydric alcohol component may be replaced by dihydric alcohols or high boiling saturated monohydric alcohols such as glycols, octyl alcohol, dodecyl alcohol, etc. The amount of the monohydric and dihydric alcohols which may be used is 10% or less of the total hydroxyl equivalent charge.

In a similar manner up to about 10% of the carboxyl equivalents may be replaced by high boiling saturated monocarboxylic acids such as benzoic, caproic or higher acids.

Catalysts for the alkyd condensation reaction are metal oxides, metal naphthenates, etc. From 0.05 to 0.2% by weight based on polyhydric alcohol may be used. If the oil acids are used in place of the oils, it is not generally necessary to use a catalyst.

It is preferred to carry out the reaction between the unsaturated compound and drying oil modified alkyd resin in solution in an inert solvent such as xylol, benzene, toluene, petroleum hydrocarbon, etc. The reaction may be carried out at reflux temperature at atmospheric pressures or at somewhat lower temperatures, which may depend on the volatility of the polymerizable compound and solvent.

The copolymerization reaction is preferably carried out in the presence of or in contact with various peroxide catalysts such as benzoyl peroxide, lauroyl peroxide, hydrogen peroxide, acetyl peroxide, dialkyl peroxides, di(tertiary butyl) peroxide, etc. From about 0.05% to about 5% by weight of catalyst based on the polymerizable monomer may be used.

The aryl sulfonamide modified melamine resins are made by reacting melamine with formaldehyde, an alcohol, and an aryl sulfonamide. The toluene sulfonamide shown in the examples may be replaced in whole or in part by other aryl sulfonamides, such as, benzene sulfonamide and ring-substituted benzene sulfonamides in which the substituent on the ring is an alkyl group. The amount of aryl sulfonamide used may be varied from .1 to 1 or more mols per mol of melamine with the preferred range varying between .2 and .4 mol of aryl sulfonamide per mol of melamine. The butanol shown in Example II may be substituted in whole or in part by other alcohols and substituted alcohols including aliphatic, cycloaliphatic, aromatic, nitro, and amino alcohols, such as ethanol, propanol, isopropanol, octanols, cetyl alcohol, stearyl alcohol, cyclohexanol, benzyl alcohol, 2-nitro-1-butanol, 2-amino-1-butanol, etc. The amount of formaldehyde used may vary from 1 mol per mol of melamine to 6 or more mols per mol of melamine. Methods for carrying out the reaction and for obtaining resins having the desired properties are set forth and claimed in the copending U. S. application S. N. 718,269, filed December 24, 1946, now Patent No. 2,508,875. In general, the melamine, formaldehyde and sulfonamide are reacted together under alkaline conditions and then further reacted with an alcohol or mixture of alcohols under acid conditions. The amount of modified melamine resin used may be varied from about 10 to about 1000 parts per 100 parts of drying oil modified alkyd resin copolymer.

The resins of this invention are soluble in aromatic solvents such as xylol, toluol, benzol, etc. and are compatible with alkyd and melamine resins prior to being baked or cured. They may be applied as protective coatings and the like to various surfaces such as metal, wood, paper, glass, ceramics, etc. by conventional methods such as spraying, roll coating, dipping, brushing, etc. and have exceptionally good adhesion to most surfaces.

Prior to curing, the resins may be compounded with various conventional additives such as fillers, pigments, lubricants, dyes, natural or synthetic resins, non-drying oils, plasticizers, etc.

The resins may be cured quickly and completely by heating them at moderately elevated temperatures, for example, between about 60° C. and about 150° C. The cured films are hard and flexible, resistant to alkalies, solvents, sunlight and weathering and they retain their high gloss over long periods of time.

It is obvious that many variations may be made in the products and processes of this invention without departing from the spirit and scope thereof as defined in the appended claims.

What is claimed is:

1. A curable heat reaction product of 100 parts of a modified alkyd resin with from 10 to 1000 parts of a modified melamine resin, said alkyd resin consisting essentially of a soluble fusible copolymer of an unsaturated monomeric material taken from the group consisting of polymerizable monovinyl aromatic hydrocarbons containing no aliphatic unsaturation other than the vinyl group, ring-substituted alkyl derivatives thereof, ring-substituted chlorine derivatives thereof and alpha-alkyl substituted derivatives thereof, with a drying oil alkyd resin containing from 40 to 65% by weight of a drying oil in chemical combination, said alkyd resin having been prepared from a polyhydric alcohol containing at least three hydroxy groups and a polycarboxylic acid free from non-benzenoid unsaturation, the ratio of oil-modified alkyd resin to unsaturated monomer varying from 100:50 to 100:150 on a weight basis, said melamine resin comprising the product of the reaction under alkaline conditions between 1 mol of melamine, 1–6 mols of formaldehyde, and an aryl sulfonamide followed by the reaction of said product with a monohydric alcohol under acid conditions, the aryl sulfonamide being taken from the group consisting of benzene sulfonamide and benzene sulfonamides substituted in the ring by an alkyl group and being present in the ratio of from 0.1 to 1.0 mol per mol of melamine.

2. A heat reaction product as in claim 1 wherein the unsaturated monomeric material is styrene.

3. A heat reaction product as in claim 1 wherein the drying oil is dehydrated castor oil.

4. A heat reaction product as in claim 1 wherein the aryl sulfonamide is para toluene sulfonamide.

5. A process for preparing a curable heat reaction product which comprises reacting 100 parts of a modified alkyd resin with from 10 to 1000 parts of a modified melamine resin, said alkyd resin consisting essentially of a soluble fusible copolymer of an unsaturated monomeric material taken from the group consisting of polymerizable monovinyl aromatic hydrocarbons containing no aliphatic unsaturation other than the vinyl group, ring-substituted alkyl derivatives thereof, ring-substituted chlorine derivatives thereof and alpha-alkyl substituted derivatives thereof, with a drying oil alkyd resin containing from 40 to 65% by weight of a drying oil in chemical combination, said alkyd resin having been prepared from a polyhydric alcohol containing at least three hydroxy groups and a polycarboxylic acid free from non-benzenoid unsaturation, the ratio of oil-modified alkyd resin to unsaturated monomer varying from 100:50 to 100:150 on a weight basis, said melamine resin comprising the product of the reaction under alkaline conditions between 1 mol of melamine, 1–6 mols of formaldehyde, and an aryl sulfonamide followed by the reaction of said product with a monohydric alcohol under acid conditions, the aryl sulfonamide being taken from the group consisting of benzene sulfonamide and benzene sulfonamides substituted in the ring by an alkyl group and being present in the ratio of from 0.1 to 1.0 mol per mol of melamine.

6. A process as in claim 5 wherein the unsaturated monomeric material is styrene.

7. A process as in claim 5 wherein the drying oil is dehydrated castor oil.

8. A process as in claim 5 wherein the aryl sulfonamide is para toluene sulfonamide.

JOEL FANTL.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,218,474 | Moore | Oct. 15, 1940 |
| 2,305,224 | Patterson | Dec. 15, 1942 |
| 2,368,451 | D'Alelio | Jan. 30, 1945 |
| 2,392,710 | Wakeford et al. | Jan. 8, 1946 |
| 2,508,875 | Scott | May 23, 1950 |

OTHER REFERENCES

Hodgins et al., Ind. Eng. Chem., pages 769–779, June 1941.